United States Patent
Kaneko (10) Patent No.: US 10,684,901 B2
(45) Date of Patent: Jun. 16, 2020

(54) DATA STORE DEVICE AND DATA MANAGEMENT METHOD

(71) Applicant: HITACHI, LTD., Tokyo (JP)

(72) Inventor: Yuki Kaneko, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/327,921

(22) PCT Filed: Aug. 10, 2017

(86) PCT No.: PCT/JP2017/029032
§ 371 (c)(1),
(2) Date: Feb. 25, 2019

(87) PCT Pub. No.: WO2018/037930
PCT Pub. Date: Mar. 1, 2018

(65) Prior Publication Data
US 2019/0227859 A1    Jul. 25, 2019

(30) Foreign Application Priority Data

Aug. 23, 2016  (JP) ................... 2016-162367

(51) Int. Cl.
*G06F 9/54* (2006.01)
*G06F 9/50* (2006.01)
(Continued)

(52) U.S. Cl.
CPC .............. *G06F 9/546* (2013.01); *G06F 9/50* (2013.01); *G06F 9/5038* (2013.01); *G06F 9/54* (2013.01);
(Continued)

(58) Field of Classification Search
CPC .......... G06F 9/5038; G06F 9/54; G06F 9/546; H04L 67/1004; H04L 67/1097; H04L 67/42
See application file for complete search history.

(56) References Cited

U.S. PATENT DOCUMENTS 5,999,964 A     12/1999  Murakata et al.
8,996,707 B2 *  3/2015   Nandagopal ............ H04L 45/00
                                             709/229
(Continued)

FOREIGN PATENT DOCUMENTS

JP     09-167145 A    6/1997
JP     2000-259605 A  9/2000
(Continued)

OTHER PUBLICATIONS

Ahn et al "System and a method for balancing load based on fuzzy grouping, particularly for balancing load among server objects, which are operated in serial, in a distributed object computing environment" 2007 DERWENT ACC-No. 2007-568032 1 page.*
(Continued)

*Primary Examiner* — Charles E Anya
(74) *Attorney, Agent, or Firm* — Mattingly & Malur, PC (57) ABSTRACT

A technique enabling smooth data transfer in a system for accumulating and transferring data is provided. The invention is directed to a data storage device including a plurality of storage devices; and a data control unit configured to receive data, store the data in the storage devices, receive a data acquisition request, acquire data from the storage device, and transmit the data, wherein the data control unit selects a target storage device to search for data related to the data acquisition request based on storage status information regarding the data stored in the plurality of data storage devices.

8 Claims, 5 Drawing Sheets

(51) Int. Cl.
*H04L 29/08* (2006.01)
*H04L 29/06* (2006.01)

(52) U.S. Cl.
CPC ...... *H04L 67/1004* (2013.01); *H04L 67/1097* (2013.01); *H04L 67/42* (2013.01)

(56) References Cited

U.S. PATENT DOCUMENTS

2015/0236974 A1\* 8/2015 Minamitake .......... H04L 47/726
　　　　　　　　　　　　　　　　　　　　 709/226
2017/0279875 A1\* 9/2017 Gupta ................. H04L 67/1002

FOREIGN PATENT DOCUMENTS

| JP | 2016-018222 A | 2/2016 |
|---|---|---|
| WO | 2012/172588 A1 | 12/2012 |

OTHER PUBLICATIONS

International Search Report of PCT/JP2017/029032 dated Sep. 12, 2017.

\* cited by examiner

STATISTICS INFORMATION

| MESSAGE QUEUE NAME | REQUEST TYPE | AVERAGE NUMBER OF PROCESSED MESSAGE DATA [msg/sec] |
|---|---|---|
| Queue_A | ACQUIRE | 2.5 |
| | ADD | 1.5 |
| Queue_B | ACQUIRE | 3.5 |
| | ADD | 4.0 |

[FIG. 3]

MESSAGE DATA INFORMATION SUMMARY

| MESSAGE DATA INFORMATION NAME | INFORMATION UPDATED TIME | MESSAGE QUEUE NAME | PRIORITY | NUMBER OF DATA |
|---|---|---|---|---|
| 332a | 10:20:30.25 | Queue_A | HIGH | 1 |
| | | | LOW | 1 |
| | | Queue_B | HIGH | 1 |
| | | | LOW | 2 |
| 332b | 10:20:29.50 | Queue_A | HIGH | 2 |
| | | | LOW | 1 |
| | | Queue_B | HIGH | 0 |
| | | | LOW | 0 |

[FIG. 4]

MESSAGE DATA INFORMATION

| IDENTIFIER | MESSAGE QUEUE NAME | PRIORITY | MESSAGE DATA |
|---|---|---|---|
| 2016122823590615 | Queue_A | LOW | ABC |
| 2016122823591305 | Queue_B | LOW | EFG |
| 2016122823592631 | Queue_A | HIGH | DEF |
| 2016122823593738 | Queue_B | HIGH | HIJ |

MESSAGE DATA INFORMATION SUMMARY

| MESSAGE DATA INFORMATION NAME | QUEUE NAME | PRIORITY | NUMBER OF DATA | INFORMATION OBTAINED TIME |
|---|---|---|---|---|
| 332a | Queue_A | HIGH | 12 | 10:20:30.50 |
| | | LOW | 2 | |
| 332b | Queue_A | HIGH | 16 | 10:20:30.00 |
| | | LOW | 5 | |

DATA STORE DEVICE AND DATA MANAGEMENT METHOD

TECHNICAL FIELD

The present invention relates to a message queue system for transferring message data received from a client to a service providing server.

BACKGROUND ART

In recent years, with the development of the Internet and communication devices, the numbers of pieces of data and amounts of message data transmitted from personal smart devices are also increasing. In a system that processes these message data, it is necessary to construct a system by using distributed data storage in order to improve extensibility and serviceability of the system.

A distributed processing type message queue system that stores message data in distributed data storages and processes message data in a distributed manner includes a plurality of message queue servers, for example. Each message queue server includes a storage device that stores message data. The plurality of message queue servers share storage devices and provide a message queue for each storage device between a client and a service providing server.

As the plurality of message queue servers share storage devices with one another, large-capacity storage can be implemented. In addition, the storage capacity can be easily increased by adding a message queue server. Also, serviceability can be improved by duplicating message data between message queue servers.

There is a related technique disclosed in Patent Literature 1. The PTL 1 discloses a technique for controlling a processing order based on correlation between different messages within a same message queue.

CITATION LIST

Patent Literature

PTL 1: JP-A-2016-18222

SUMMARY OF INVENTION

Technical Problem

In the distributed processing type message queue system as described above, in order to equally use respective storage devices, a round robin method is generally used in case of determining a storage device to store message data to or a storage device to acquire message data from.

However, even when priorities are given to message data, storage devices that are storage destinations or sources of acquisition of message data are determined regardless of the priorities, and Thus transfer of high priority message data to a service providing server may be delayed.

The present invention provides a technique that enables smooth data transfer in a system that accumulates and transfers data.

Solution to Problem

A data storage device according to an aspect of the present invention include a plurality of storage devices; and a data control unit configured to receive data, store the data in the storage devices, receive a data acquisition request, acquire data from the storage device, and transmit the data, wherein the data control unit selects a target storage device to search for data related to the data acquisition request based on store status information regarding the data stored in the plurality of data storage devices.

Advantageous Effects of Invention

According to an aspect of the present invention, in the data storage device consisting of a plurality of storage devices, a data storage device to acquire data from is determined based on storage status related to data in each of the storage devices, and thus data transfer can be performed smoothly.

BRIEF DESCRIPTION OF DRAWINGS

FIG. 4 is a diagram showing the message data information 332a.

FIG. 5 is a sequence diagram showing a process for updating a message data information summary executed by the message queue controller 310a.

FIG. 6 is a sequence diagram showing a process for updating the message data information summary registry 318 executed by the message queue controller 310a.

FIG. 7 is a sequence diagram showing a process executed when the message queue controller 310a receives a request to acquire message data from the client 100a.

DESCRIPTION OF EMBODIMENTS

Hereinafter, embodiments of the present invention will be described with reference to the drawings.

(1) Configuration

Figure 1:
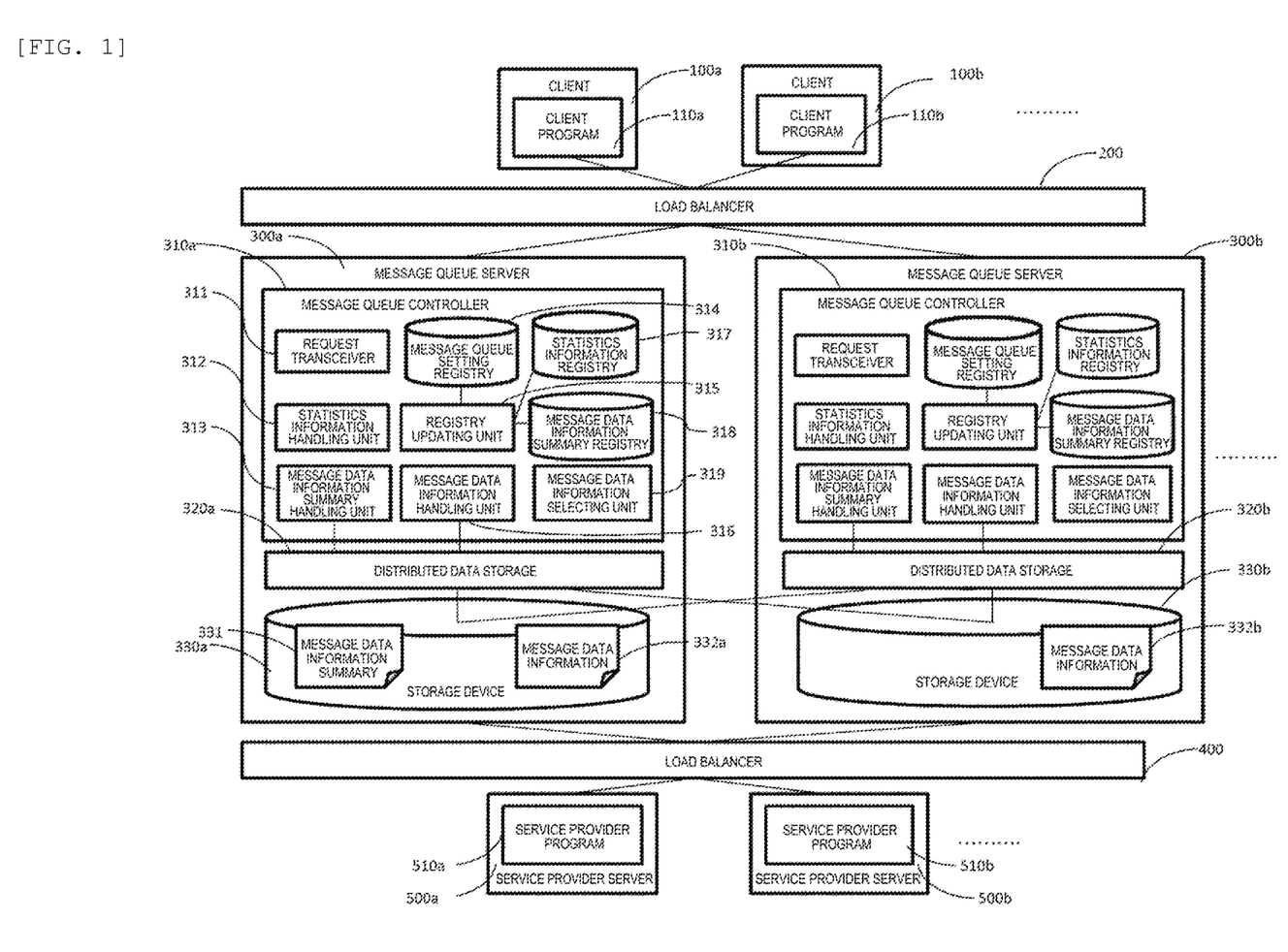
FIG. 1 is a diagram showing a configuration example of a distributed processing type message queue system.

FIG. 1 is a diagram showing a configuration example of a distributed processing type message queue system. The message queue system includes clients 100a and 100b, a load balancer 200, message queue servers 300a and 300b, a load balancer 400, and service providing servers 500a and 500b.

The service providing servers 500a and 500b are servers that provide services to the clients 100a and 100b. The service providing server 500a and the service providing server 500b have a same configuration, and the load is distributed thereto. A service provider program 510a is installed on the service providing server 500a. A service provider program 510b is installed on the service providing server 500b.

The clients 100a and 100b are clients using services of the service providing servers 500a and 500b. The client 100a and the client 100b have the same configuration. A client program 110a is installed on the client 100a, and the client 100a functions by executing the client program 110a. A client program 110b is installed on the client 100b, and the client 100b functions by executing the client program 110b.

The load balancer 200 distributes requests transmitted by the client programs 110a and 110b of the clients 100a and 100b to a plurality of message queue servers 300a and 300b.

The message queue servers 300a and 300b are servers that temporarily store message data of requests from the clients 100a and 100b to the service providing servers 500a and 500b and perform queue control on message queues. The message queue server 300a and the message queue server 300b have the same configuration, and the load is distributed thereto.

The message queue server 300a is a server constituting a message queue system and includes a storage device 330a, a distributed data storage 320a, and a message queue controller 310a. Similarly, the message queue server 300b is a server constituting a message queue system and includes a storage device 330b, a distributed data storage 320b, and a message queue controller 310b. The message queue controllers 310a and 310b are implemented by executing a software program by a CPU (not shown) and control queuing of message data. The internal configurations and operations of the message queue controller 310a and 310b will be described later.

The distributed data storages 320a and 320b share the storage devices 330a and 330b of the message queue servers 300a and 300b, and thus the distributed data storages 320a and 320b can use the storage devices 330a and 330b interchangeably.

The load balancer 400 distributes message data transmitted by the message queue controllers 310a and 310b of the message queue servers 300a and 300b to the service providing servers 500a and 500b.

The service providing servers 500a and 500b are servers that provide services to the clients 100a and 100b. The service provider program 510a is installed on the service providing server 500a, and the service providing server 500a functions by executing the service provider program 510a. The service provider program 510b is installed on the service providing server 500b, and the service providing server 500b functions by executing the service provider program 510b.

Although FIG. 1 shows two clients, two message queue servers, and two service providing servers, the configuration is merely an example, and there may be two or more clients, two or more message queue servers, and two or more service providing servers.

Next, the message queue servers 300a and 300b will be described in detail. Descriptions below will be given with respect to the message queue server 300a.

The message queue controller 310a functions such that a CPU executes a software program and utilizes hardware resources, such as a main storage device and an auxiliary storage device. The message queue controller 310a includes a request transceiver 311, a statistics information handling unit 312, a message data information summary handling unit 313, a registry updating unit 315, a message data information handling unit 316, and a message data information selecting unit 319.

The request transceiver 311 exchanges message data of requests with a plurality of clients 100a and 100b and a plurality of service providing servers 500a and 500b.

The statistics information handling unit 312 calculates statistical information regarding message data of requests received from the clients 100a and 100b and stores the statistical information in a statistics information registry 317 via the registry updating unit 315. The statistical information regarding the message data is information obtained by summing up additions of message data to the storage devices 330a and 330b and acquisitions of message data from the storage devices 330a and 330b.

Figure 2:
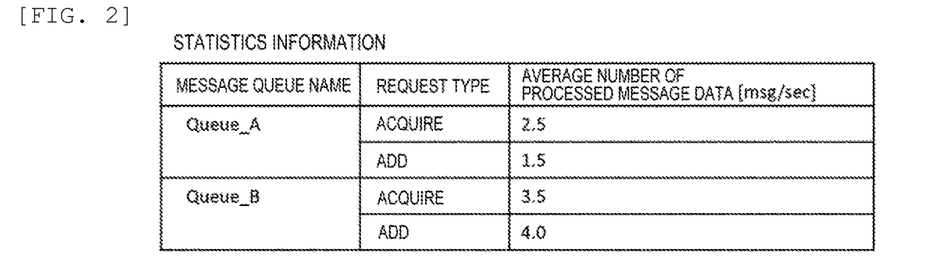
FIG. 2 is a diagram showing statistical information stored in the statistics information registry 317.

FIG. 2 is a diagram showing statistical information stored in the statistics information registry 317. FIG. 2 shows an example of statistical information of message data calculated by the statistics information handling unit 312. The statistical information includes a name of a message queue, a request type transmitted with respect to the corresponding message queue, and an average value of the numbers of message data processed within a unit time. The clients 100a and 100b designate queues and transmit requests. Here, two message queues Queue_A and Queue_B are defined. The message queue servers 300a and 300b control addition and acquisition of message data for each message queue.

For example, in the Queue_A of FIG. 2, it shows that the client programs 110a and 110b of the clients 100a and 100b add an average of 1.5 messages to the Queue_A per second, and the service provider programs 510a and 510b of the service providing servers 500a and 500b acquire an average of 2.5 messages from the Queue_A per second.

Returning to FIG. 1, the registry updating unit 315 records statistical information in the statistics information registry 317 according to an instruction of the statistics information handling unit 312.

The message data information summary handling unit 313 periodically or irregularly acquires and updates a message data information summary 331 via the distributed data storage 320a. The message data information summary 331 is stored in a message data information summary registry 318 and updated there.

When message data is written to the storage devices 330a and 330b, information regarding the message data is recorded. Priorities are given to message data. There are two levels of message priorities, that is, "high" and "low".

Figure 3:
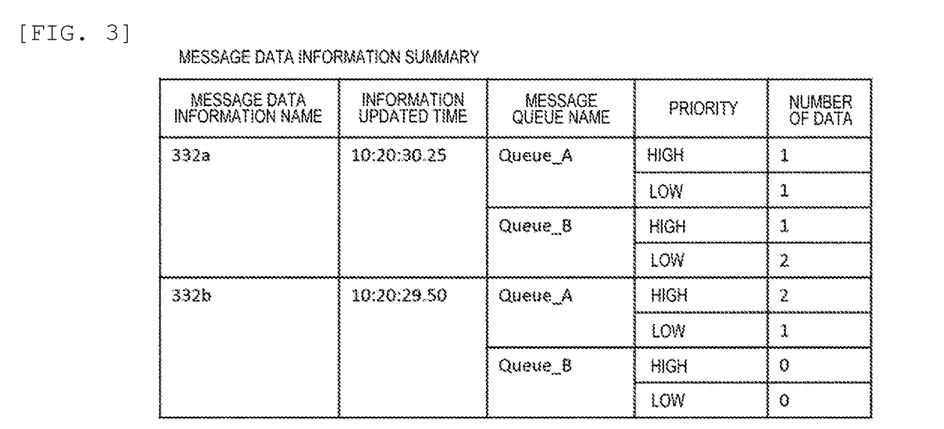
FIG. 3 is a diagram showing a message data information summary stored in the message data information summary registry 318.

FIG. 3 is a diagram showing a message data information summary stored in the message data information summary registry 318. The message data information summary 331 is information acquired by accumulating information regarding message data.

In the message data information summary 331, results of counting the number of message data (the number of messages) recorded in the storage devices 330a and 330b for each of the storage device 330a and 330b and the each message queue are arranged by each priority. The message data information summary 331 is updated regularly or irregularly. As shown in FIG. 3, the message data information summary 331 includes message data information names, information updated times, message queue names, priorities, and the numbers of messages, in correspondence to the storage devices 330a and 330b.

In the example shown in FIG. 3, summary information regarding the message data information and 332b respectively corresponding to the storage devices 330a and 330b is included. In the message data information 332a, a total of five pieces of message data are stored in the storage device 330a. One of the messages is a low priority message stored in the message queue Queue_A, and another one is a high priority message stored in the message queue Queue_B. Two other messages are low priority messages stored in the message queue Queue_B, and the other one message is a high priority message stored in the message queue Queue_B.

Returning to FIG. 1, the message data information handling unit 316 updates message data information 332a and 332b in response to requests for adding (storing to storage devices) or acquiring (reading from storage devices) of message data from the clients 100a and 100b.

Figure 4:
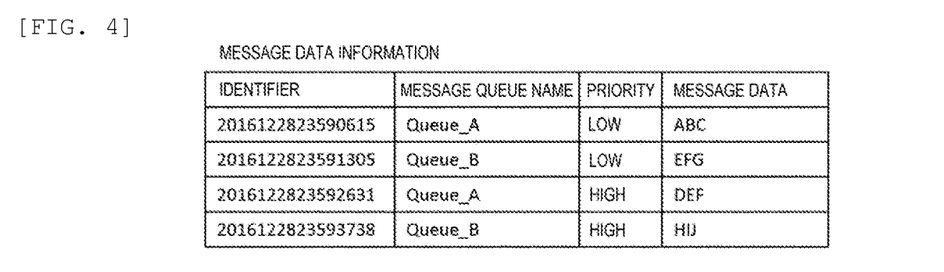

FIG. 4 is a diagram showing the message data information 332a. As shown in FIG. 4, the message data information 332a includes, for each message, an identifier for uniquely specifying corresponding message data, a name of a message queue in which the message data is registered, a priority of the message data, and the message data itself. In the example shown in FIG. 4, low priority message data "ABC" and high priority message data "DEF" are stored in the message queue Queue_A. Low priority message data "EFG" and high priority message data "HU" are stored in the message queue Queue_B.

The message data information selecting unit 319 determines message data of which message data information is to be updated by the message data information handling unit 316.

The message data information selecting unit 319 determines message data to be handled according to a selecting method corresponding to types of requests for message data.

When requests are requests to store message data transmitted by the clients 100a and 100b in the storage devices 330a and 330b, the message data information selecting unit 319 determines the message data information 331 regarding the storage devices 330a and 330b (adding destinations) to store the message data in a round robin fashion.

On the other hand, when requests are requests to acquire message data transmitted from the service providing servers 500a and 500b from the storage devices 330a and 330b, the message data information selecting unit 319 determines to acquire the message data from the storage devices 330a and 330b (sources of acquisition) from which high priority message data are highly likely to be acquired, based on statistics information stored in the statistics information registry 317 and a message data information summary stored in the message data information summary registry 318.

Next, a specific method of determining which of the storage devices 330a and 330b (source of acquisition) the message queue controller 310a and 310b acquire message data from will be described in detail. The message queue controllers 310a and 310b periodically or irregularly create message data information summaries. Furthermore, the message queue controllers 310a and 310b periodically or irregularly store the message data information summaries in the message data information summary registry 318 and, in response to requests from the service providing servers 500a and 500b, acquire message data from any one of the storage devices 330a and 330b and transmit the message data to the service providing servers 500a and 500b. Hereinafter, the operation of the message queue server 300a will be described as an example.

(2) Operation

Figure 5:
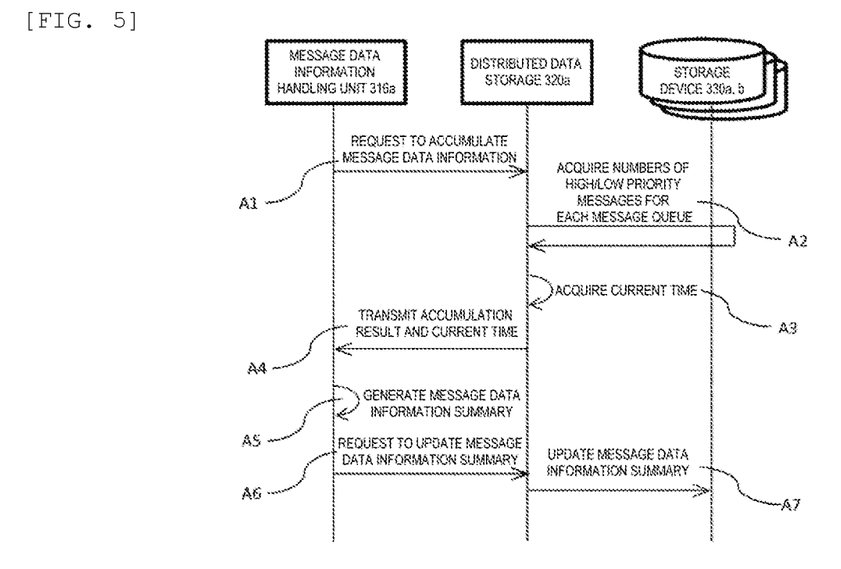

FIG. 5 is a sequence diagram showing a process for updating a message data information summary executed by the message queue controller 310a.

The message data information handling unit 316 periodically or irregularly transmits request to accumulate message data information to the distributed data storage 320a (step A1). The distributed data storage 320a that has received the request to accumulate message data information accesses the message data information 332a of the storage device 330a and accumulates the number of pieces of high priority message data and the number of pieces of low priority message data for each message queue (step A2). After the numbers of pieces of message data are accumulated, the distributed data storage 320a acquires a current time (step A3) and transmits a result of the accumulation of the step A1 and the current time to the message data information handling unit 316 (step A4).

The message data information handling unit 316 that has received the result of accumulation of the step A2 and the current time that are transmitted in the step A4 creates a message data information summary regarding the message data information 332a (step A5).

The message data information handling unit 316 that has created the message data information summary in the step A5 transmits a request to update a message data information summary including the created message data information summary to the distributed data storage 320a (step A6).

The distributed data storage 320a that has received the request to update a message data information summary in the step A6 reflects the contents of the message data information summary included in the received request to update a message data information summary to the message data information summary 331 (step A7).

As the message queue controllers 310a and 310b of the message queue servers 300a and 300b perform processes equivalent to those of the steps A1 to A7, a result of accumulating message data information regarding all message data is reflected to the message data information summary 331.

Figure 6:
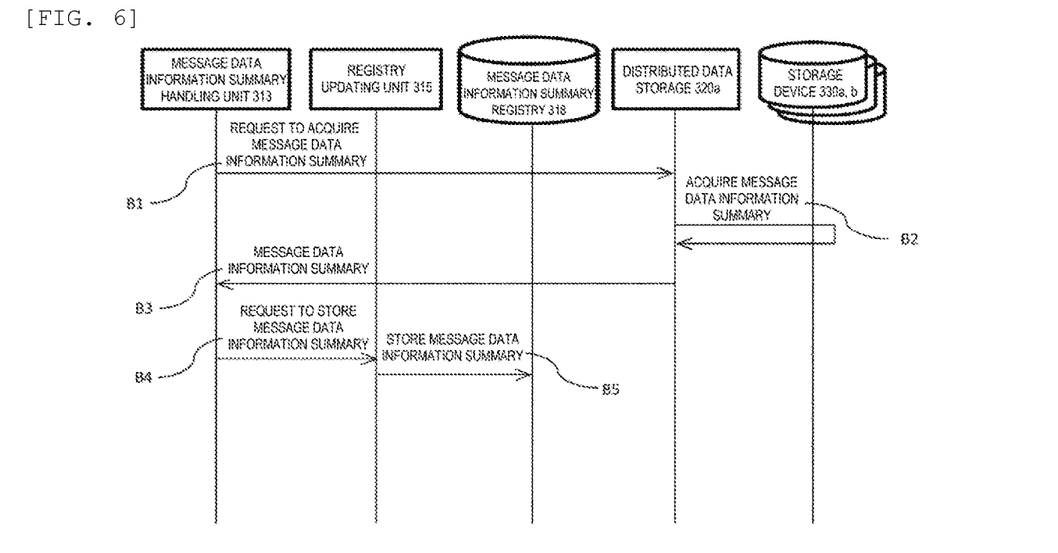

FIG. 6 is a sequence diagram shown a process for updating the message data information summary registry 318 executed by the message queue controller 310a.

The message data information summary handling unit 313 of the message queue controller 310a periodically or irregularly transmits a request to acquire a message data information summary to the distributed data storage 320a (step B1).

The distributed data storage 320a that has received the request to acquire acquires the message data information summary 331 from the storage devices 330a and 330b (step 92) and transmits it to the message data information summary handling unit 313 (step B3). The message data information summary handling unit 313 requests the registry updating unit 315 to store the acquired message data information summary 331 (step B4). The registry updating unit 315 stores the message data information summary 331 in the message data information summary registry 318 (step B5).

Figure 7:
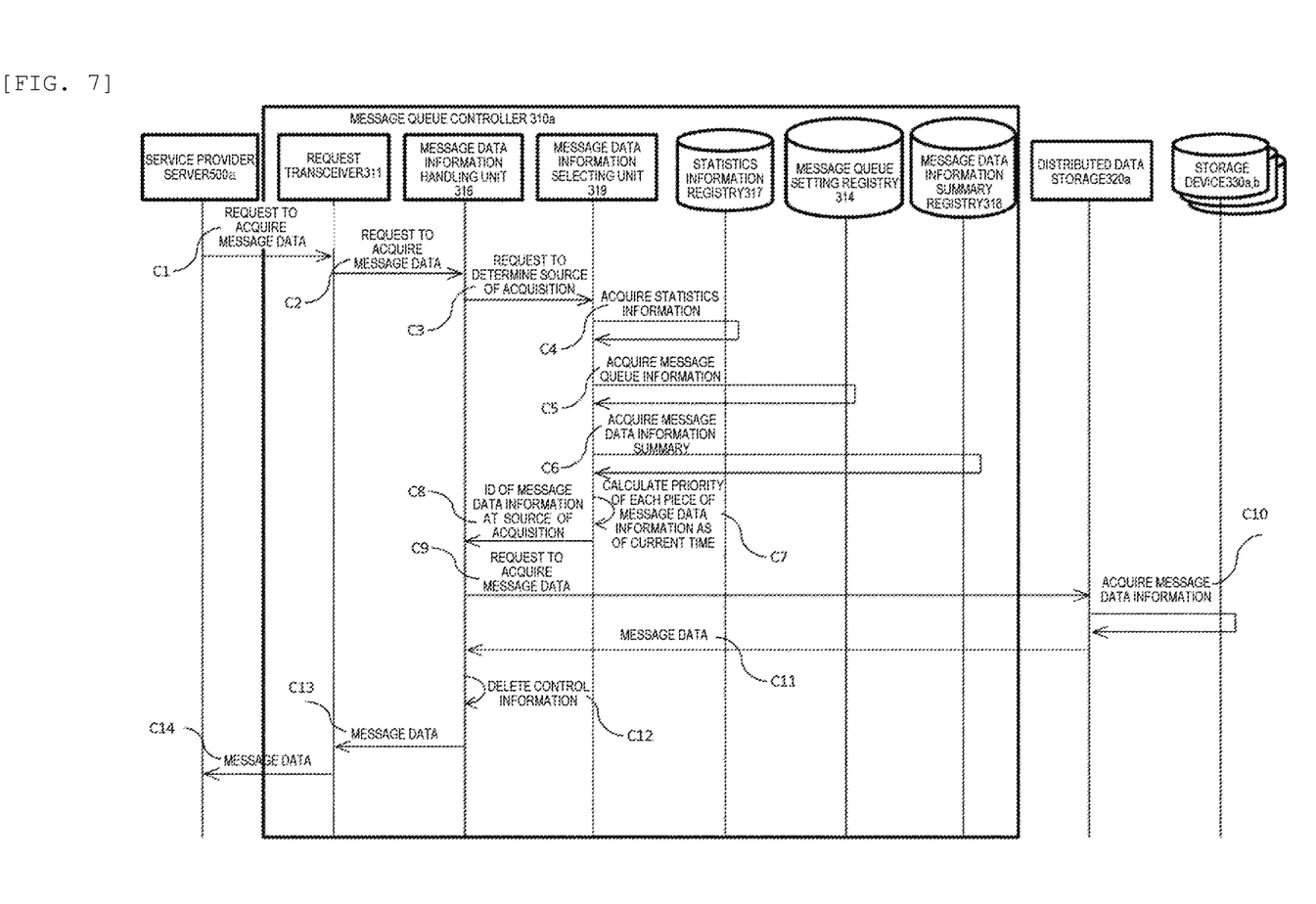

FIG. 7 is a sequence diagram showing a process executed when the message queue controller 310a receives a request to acquire message data from the client 100a.

First, the client 100a transmits a request to acquire message data (message data acquisition request) to the request transceiver 311 of the message queue controller 310a (step C1) In the message data acquisition request, a message queue to acquire message data from is designated. At that time, the client 100a states the message queue name of the designated message queue in the request.

As shown in FIG. 4, a plurality of pieces of message data can be registered in one message queue designated by the message queue name. In other words, a message data acquisition request is a request for any message data belonging to the message queue corresponding to a designated message queue name "Queue_A", for example. If high priority message data and low priority message data are registered in a message queue, the high priority message data will be preferentially acquired. Naturally, a message data acquisition request may also include various information, such as the number of pieces of message data to acquire.

The request transceiver 311 that has received the message data acquisition request transmits the received message data acquisition request to the message data information handling unit 316 (step C2).

The message data information handling unit 316 transmits a request to determine a source of acquisition to the message data information selection unit 319 to determine which of the storage devices 330a and 330b is the source of acquisition of message data (step C3).

The message data information selecting unit 319 that has received the request to determine a source of acquisition accesses the statistics information registry 317, the message data information summary registry 318, and the message queue setting registry 314 and acquires an average number of pieces of acquired message data, a message data information summary, and the number of message queue controlling subjects (steps C4 to C6).

Here, the average number of pieces of acquire message data is an average number of pieces of processed message data whose request type is 'acquire' in the statistical information shown in FIG. 2.

In the message queue setting registry 314, various setting information related to a message queue is registered in advance. As one of the setting information, the number of message queue controlling subjects is registered. The number of message queue controlling subjects is information indicating the number of subjects that controls a message queue. The message queue controllers 310a and 310b are the subjects controlling a message queue. In other words, the subjects controlling a message queue may be message queue control programs executed by CPUs in the message queue servers 300a and 300b.

Next, the message data information selecting unit 319 further uses a current time acquired using an OS standard function in addition to acquired statistics information, a message data information summary, and the number of message queue controlling subjects to predict a storage device from which high priority data are most likely to be acquired as of the current time. Here, as an example, the message data information 332a and 332b corresponding to the predicted storage devices 330a and 330b are output as the message data information 332a and 332b to be prioritized.

In detail, first, the message data information selecting unit 319 applies an Equation (1) to calculate the number of pieces of message data (the number of pieces of acquired message data) that would have been acquired from an information updated time of a message data information summary to the current time.

number of pieces of acquired message data=(current time−information acquired time)×average number of pieces of acquired message data×number of message queue controlling subjects (1)

When the number of pieces of acquired message data can be predicted, based on the number of pieces of acquired message data and the number of messages of a message data information, summary, the number of pieces of message data stored in each of the storage device 330a and 330b (the number of pieces of message data as of the current time) can be predicted. Based on the number of pieces of message data as of the current time, the storage devices 330a and 330b from which high priority message data are mostly likely to be acquired can be predicted. Various methods based on various policies can be employed as a method for the prediction.

Here, the information acquired time is the updated time of the message data information summary acquired in the step A3 in FIG. 5. The average number of pieces of acquired message data is the average value of the number of pieces of message data acquired from the storage devices 330a and 330b per unit time. The average number of pieces of acquired message data may be calculated based on a record of message acquisitions. For example, the average number of pieces of acquired message data may be calculated for either each of storage data information, each of the message queue controllers 310a and 310b or an entire message queue system.

Here, as an example, time information is used to determine the storage devices 330a and 330b as sources of acquisitions of message data, but the present invention is not limited thereto. In another example, instead of using time information, a determination may be made based on acquired statistical information, a message data information summary, and the number of message queue controlling subjects.

Here, as an example, the storage devices 330a and 330b have been determined as sources of acquisitions of message data by using the number of pieces of message data which would have been acquired from an information updated time to a current time, but the present invention is not limited thereto. In another example, the storage devices 330a and 330b, which become sources of acquisitions of message data, may be determined based on a calculation taking not only the message data acquired from the information updated time to the current time, but also message data to be added into account. In that case, the average number of pieces of processed message data (the average number of added message data) whose request type is add may be used to predict the number of pieces of message data as of the current time, wherein the average number of added message data is included in statistical information.

A method of predicting a storage device from which high priority message data is most likely to be acquired will be described in detail with reference to FIG. 8. The prediction of a storage device from which high priority message data is most likely to be acquired is determination of a storage device that becomes a source of acquisition of message data.

Figure 8:
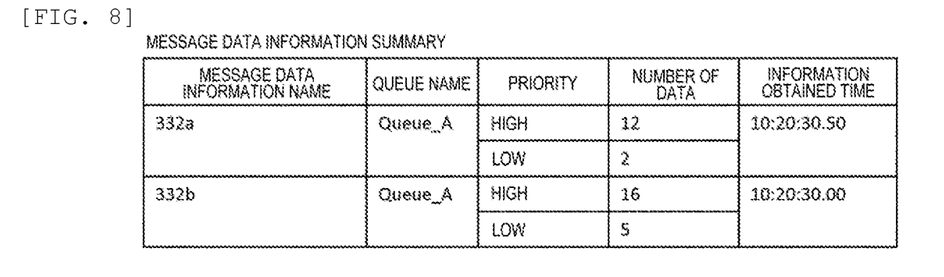
FIG. 8 is a diagram for describing a specific example of determination of a storage device that becomes a source of data acquisition.

FIG. 8 is a diagram for describing a specific example of determination of a storage device that becomes a source of data acquisition. As described above, in the message data information summary registry 318, a message data information summary acquired at a certain time point is stored. FIG. 8 shows a message data information summary used for describing the specific example. Since descriptions below will be given with the message queue Queue_A as an example, FIG. 8 shows information related to the message queue Queue_A only. Furthermore, in the description of the specific example, it is assumed that the current time is 10:20:30.75, the average number of pieces of acquire message data is 10 msg/sec, and the number of message queue controlling subjects is 2.

First, it is assumed that the message queue controller 310a has received a request to acquire message data for the message queue Queue_A from the service providing server 500a.

The message queue controller 310a applies the above-stated Equation (1) to the message data information summary shown in FIG. 8 and predicts the number of pieces of message data which have already been acquired from an information updated time of the message data information summary to the current time. With respect to the message data information 332a corresponding to the storage device 330a, the number of pieces of message data which have already been acquired is 5 (0.25 [sec]×10 [msg/sec]×2 [units]). Here, since it is intended to preferentially acquire high priority message data, it is predicted that the number of pieces of high priority message data stored in the storage device 330a is from 7 (minimum) to 12 (maximum) and there are 2 low priority message data.

Similarly, with respect to the message data information 332b corresponding to the storage device 330b, the number of pieces of message data which have already been acquired is 15 (0.75 [sec]×10 [msg/sec]×2 [units]). Therefore, it is predicted that the number of pieces of high priority message data stored in the storage device 330b is from 1 (minimum) to 16 (maximum) and there are 5 low priority message data.

Next, the message queue controller 310a determines relative rankings between the storage devices 330a and 330b for the possibility of acquiring high priority message data. To this end, the message queue controller 310a uses the number of pieces of message data predicted according to the Equation (1). Although an arbitrary method of determining rankings may be used, rankings may be determined in the descending order of the minimum values (minimum number) of the number of pieces of high priority message data stored as of the current time. Alternatively, ranking may be determined based in the descending order of the average values between the maximum values (maximum number) and the minimum values (minimum number) of the numbers of pieces of high priority message data stored as of the current time.

In the case where rankings are determined in the descending order of the minimum values (minimum number) of the number of pieces of high priority message data stored as of the current time, in the example shown in FIG. 8, the storage device 330a becomes the first place, and the storage device 330b becomes the second place. Therefore, the message queue controller 310a determines the storage device 330a as the source of acquisition of message data and notifies the message data information 332a corresponding thereto to the message data information handling unit 316 (step C3).

Next, the message data information handling unit 316 transmits a request to acquire message data regarding the message data information 332a in the designated source of acquisition and the storage device 330a corresponding thereto as targets to be handled to the distributed data storage 320a (step C9). The distributed data storage 320a that has received the request to acquire message data searches for high priority message data from among message data corresponding to a message queue name Queue_A in the message data information 332a and acquires message data information including corresponding message data from the storage device 330a (step C10).

If message data corresponding to the number of pieces message data requested by the service providing server 500a is not stored in the storage device 330a, the distributed data storage 320a searches high priority message data corresponding to the message queue name Queue_A in the message data information 332b of the next ranking storage device 330b and acquires message data information including corresponding message data from the storage device 330b.

Next, the distributed data storage 320a transmits the acquired message data information to the message data information handling unit 316 (step C11). The message data information handling unit 316 that has received the message data information deletes unnecessary control information like an identifier (step C12) and transmits message data to the request transceiver 311 (step C13). The request transceiver 311 that has received the message data transmits the message data to the service providing server 500a (step C14).

As the message queue controllers 310a and 310b that have received requests to acquire message data execute the above-stated processes, the delay of delivering high priority message data can be shortened.

While a request is being distributed to a plurality of storage devices in a round robin fashion in the prior art, the above-described processing method is applied to all of the message queue controllers 310a and 310b in the present embodiment. However, in this case, requests may be concentrated to a particular storage device (particular message data information). However, in the present embodiment, time points at which the message queue controller 310a and 310b acquire message data information summaries are different from each other. Therefore, even message data information regarding a same storage device become different information for the respective message queue controller 310a and 310b. Furthermore, in the Equation (1) of the present embodiment, the rankings of the storage devices 330a and 330b are determined only based on message data to be acquired and without taking data to be added into account. In the method according to the present embodiment, the older the time point at which a message data information summary is acquired is, the smaller the probability of acquiring high priority message data becomes. Therefore, concentration of requests to a specific storage device can be suppressed. In other words, concentration of requests can suppressed by using deviation of the information acquired time.

The present embodiment described above can be, summarized as follows.

A data storage device (the message queue servers 300a and 300b) according to the present embodiment includes a plurality of storage devices (the storage devices 330a and 330b) and data control units (the message queue controllers 310a and 3110b) that receive data, store the data in the storage devices, receive data acquisition requests, acquire data from the storage devices, and transmit the acquired data. The data control unit selects a storage device to search for data related to a data acquisition request based on storage status information (message data information summary) related to data stored in each of the plurality of storage devices. In the data storage device consisting of a plurality of storage devices, a data storage device to acquire data from is determined based on storage status related to data in each of the storage devices, and thus data transfer can be performed smoothly.

Also, priorities are given to the data respectively, and the storage status information includes per-priority storage status information which is storage status information related to the number of pieces of data stored in each of the plurality of storage device per priority. A data control unit selects a storage device from which high priority data is likely to be acquired. Since a storage device from which high priority data can be acquired is selected by taking an amount of data stored per priority into account, smooth data transfer can be performed in consideration of priorities.

In addition, there may be a plurality of data control units, and the plurality of data control units can store data in a plurality of storage devices and acquire data from the plurality of storage devices. Therefore, each of the plurality of data control units stores storage status information. When the plurality of data control units receive data acquisition requests, each of the plurality of data control units selects a data storage device to search for data by using the storage status information. In a configuration in which a plurality of data control units share a plurality of storage devices, smooth data transfer can be implemented with an appropriate determination based on storage status information.

In addition, the storage status information includes information acquired at a predetermined time point, and the plurality of data control units use storage status information corresponding to time points independent of each other with respect to data stored in a same storage device. Since the respective data control units use storage status information corresponding to different time points, concentration of data searches to a specific storage device can be reduced.

In addition, the storage status information includes time information regarding time points at which storage status information was acquired per priority, and the data control unit selects a storage device to search for data based on the time information related to time points at which the storage status information was acquired per priority. Since a storage device to search for data is selected based on a relationship between priorities and the numbers of pieces of data including time information data can be smoothly transferred by taking the lapse of time into account.

Also, the data control unit predicts a relationship between priorities and the numbers of pieces of data as of the current time based on the time information and selects a storage device to search for data based on the a result of the prediction. Since a storage device to searches for data is selected based on a prediction of the status of data as of the current time, smooth data transfer can be performed with high accuracy.

Furthermore, the data control unit predicts a relationship between priorities and the numbers of pieces of data as of the current time by subtracting the product of a difference between the current time and a time point indicated by time information by an average number of pieces of data acquired per unit time from the number of pieces of data per priority as of the time point indicated by the time information. Since the relationship between the priorities and the numbers of pieces of data as of the current time can be predicted by using the product of the difference between the current time and the time point indicated by the time information and the average number of pieces of data acquired per unit time, the status as of the current time can be predicted well, and smooth data transfer can be performed with high accuracy.

The average number of pieces of data acquired per unit time is the product of an average number of pieces of data that one data control unit acquires from a storage device per unit time by the number of data control units. Since an average number of pieces of data acquired per unit time is calculated and used for prediction, data can be transferred with higher accuracy.

The above-described embodiments of the present invention are merely examples for describing the present invention, and the scope of the present invention not limited to the embodiments. One of ordinary skill in the art can implement the present invention in various other modes without departing from the gist of the present invention.

REFERENCE SIGNS LIST

100a: client
100b: client
110a: client program
110b: client program.
200: load balancer
300a: message queue server
300b: message queue server
310a: message queue controller
310b: message queue controller
311: request transceiver
312: statistics information handling unit
313: message data information summary handling unit
314: message queue setting registry
315: registry updating unit
316: message data information handling unit
317: statistics information registry
318: message data information summary registry
319: message data information selecting unit
320a: distributed data storage
320b: distributed data storage
330a: storage device
330b: storage device
331: message data information summary
332a: message data information
332b: message data information
400: load balancer
500a: service providing server
500b: service providing server
510a: service provider program
510b: service provider program

The invention claimed is:

1. A data storage device comprising:
a plurality of storage devices; and
at least one processor executing a program which causes the at least one processor to execute a plurality of data control units, each data control unit configured to receive data, store the data in the storage devices, receive a data acquisition request, acquire data from the storage device, and transmit the data,
wherein a respective data control unit is further configured to select a target storage device to search for data related to the data acquisition request based on storage status information regarding data stored in each of the plurality of storage devices,
wherein priorities are given to respective pieces of the data,
wherein the storage status information includes per-priority storage status information regarding numbers of pieces of the data stored in each of the plurality of storage devices per priority and time information regarding time points at which the per-priority storage status information was acquired,
wherein the respective data control unit is further caused to select the target storage device to search for data related to the data acquisition request based on the per-priority storage status information and time information regarding time points at which the corresponding per-priority storage status information was acquired,
wherein the respective data control unit is further caused to:
predict a relationship between the priorities and the numbers of pieces of the data as of a current time by subtracting a product of a difference between the current time and a time point indicated by the time information by an average number of pieces of the data acquired per unit time from the numbers of pieces of the data per priority as of the time point indicated by the time information, and
select the target storage device to search for the data related to the data acquisition request based on a result of the prediction.

2. The data storage device of claim 1,
wherein each of the plurality of data control units is configured to respectively store the storage status information, and,
wherein, when the data acquisition request is received, each of the plurality of data control units is respectively configured to select the target storage devices to search for the data by using the respectively stored storage status information.

3. The data storage device of claim 2,
wherein the plurality of data control units use the storage status information corresponding to time points independent of one another with respect to data stored in a same one of the storage devices.

4. The data storage device of claim 1,
wherein the average number of pieces of the data acquired per unit time is the product of an average number of pieces of the data that the respective data control unit acquires from the storage devices per unit time by a number of the data control units.

5. A method of managing data in a data storage device comprising a plurality of storage devices and at least one processor executing a program which causes the processor to execute a plurality of data control units, each of the data control units respectively being configured to receive data, store the data in the storage devices, receive a data acquisition request, acquire data from the storage device, and transmit the data, each of the data control units respectively executing the method comprising:
  acquiring storage status information regarding the data respectively stored in the plurality of storage devices, pieces of the data having respective priorities, and the storage status information includes per-priority storage status information regarding numbers of pieces of the data stored in each of the plurality of storage devices per priority and time information regarding time points at which the per-priority storage status information was acquired;
  predicting a relationship between the priorities and the numbers of pieces of the data as of a current time by subtracting a product of a difference between the current time and a time point indicated by the time information by an average number of pieces of the data acquired per unit time from the numbers of pieces of the data per priority as of the time point indicated by the time information; and
  selecting a target storage device to search for data related to the data acquisition request based on a result of the prediction.

6. The method of claim 5,
wherein each of the plurality of data control units respectively acquires and stores the storage status information, and,
wherein, when the data acquisition request is received, each of the plurality of data control units respectively selects the target storage devices to search for the data by using the respectively stored storage status information.

7. The method of claim 6,
wherein the plurality of data control units store the storage status information corresponding at time points independent of one another with respect to data stored in a same one of the storage devices.

8. The method of claim 5,
wherein the average number of pieces of the data acquired per unit time is the product of an average number of pieces of the data that the respective data control unit acquires from the storage devices per unit time by a number of the data control units.

* * * * *